No. 676,342. Patented June 11, 1901.
T. ROSEBOOM.
SAW SET.
(Application filed Oct. 29, 1900.)
(No Model.) 2 Sheets—Sheet 1.
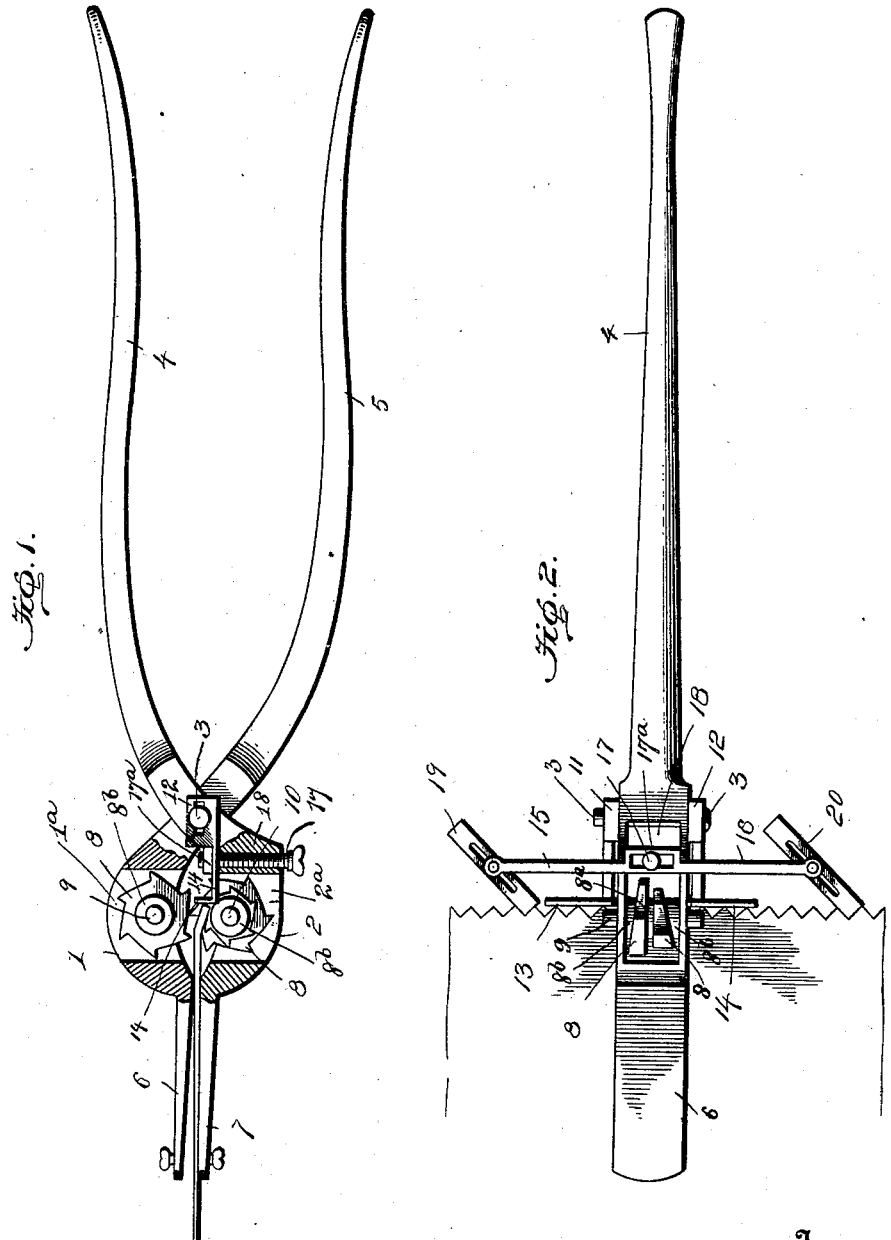
Witnesses
Inventor
Theodore Roseboom
By Victor J. Evans
Attorney

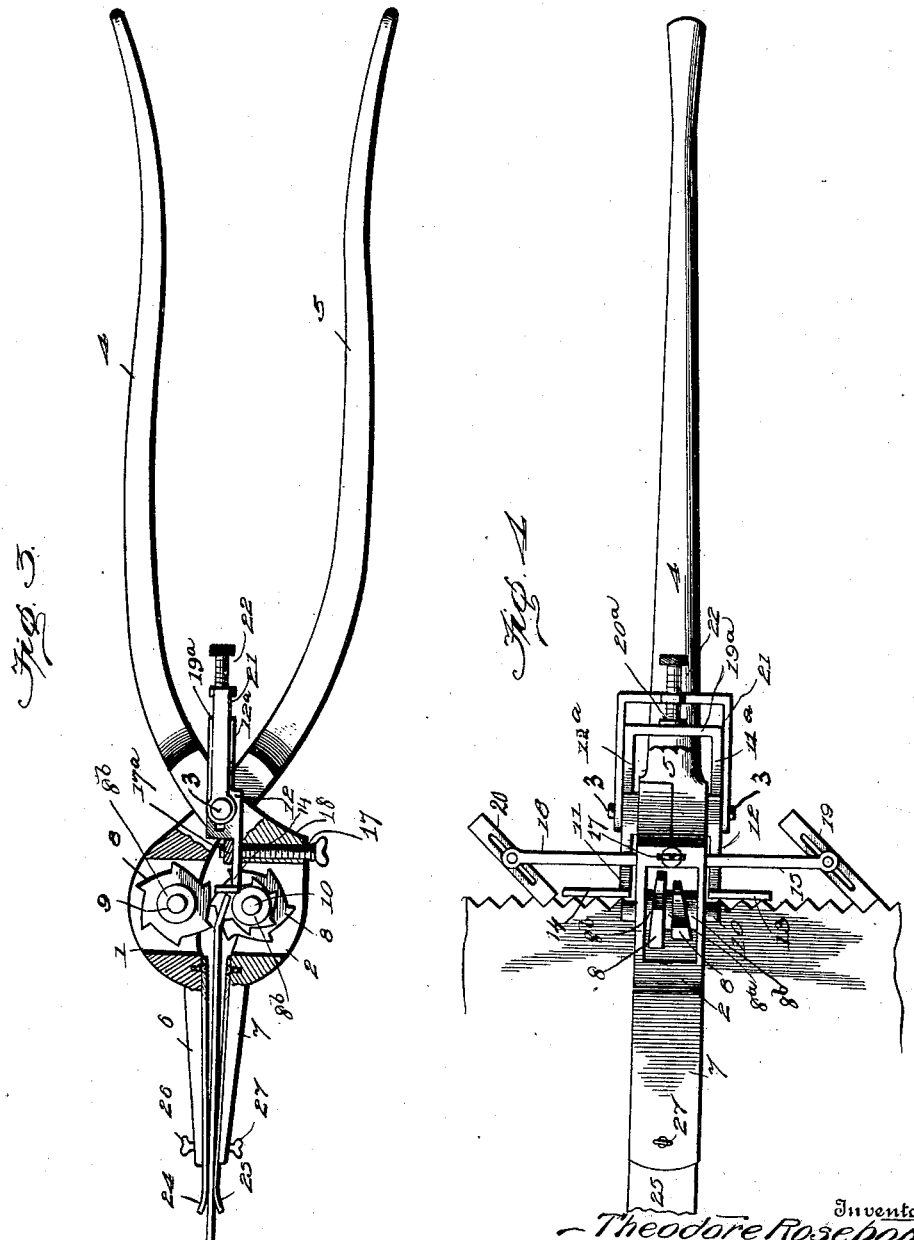

UNITED STATES PATENT OFFICE.

THEODORE ROSEBOOM, OF SAN FRANCISCO, CALIFORNIA.

SAW-SET.

SPECIFICATION forming part of Letters Patent No. 676,342, dated June 11, 1901.

Application filed October 29, 1900. Serial No. 34,833. (No model.)

*To all whom it may concern:*

Be it known that I, THEODORE ROSEBOOM, a citizen of the United States, residing at San Francisco, in the county of San Francisco and State of California, have invented new and useful Improvements in Saw-Sets, of which the following is a specification.

This invention relates to saw-sets, and the primary object thereof is to provide an improved tool whereby the setting of saw-teeth may be facilitated.

Other objects, as well as the peculiar construction of the device, will be fully explained hereinafter, and the novel features of this invention will be recited and definitely claimed.

In the drawings, Figure 1 is a side elevation of a saw-set constructed in accordance with this invention, the jaws being in section to illustrate the interior mechanism; and Fig. 2 is an edge view of the same. Figs. 3 and 4 are similar views of slight modification of the same.

Referring now to the drawings by reference-numerals, 1 and 2 designate two pivoted jaws, 1 being the front jaw and 2 the rear jaw, connected by a pivot-pin 3. Each jaw is provided with a handle, as indicated by the numerals 4 and 5, and depending extensions or blades 6 and 7, extending from the opposite ends of the jaws, as will be presently explained. It will be noticed that each jaw is provided with an opening 1ª and 2ª, respectively, in which are secured one or more wedge-shaped toothed disks 8 of different sizes or diameters. Each disk is provided with teeth to accommodate saws from the finest to the coarsest. The shafts 9 and 10, on which these disks are secured, are screw-threaded, so that the disks, which are designed to be rotated thereon, may be held in any predetermined position. Attention is also directed to the fact that the teeth in the respective coacting disks point in opposite directions when adjacent to the saw-teeth and that the disks do not aline. The object of this construction is to provide means for setting more than one tooth at a time. While I only illustrate two alternating disks, it is obvious that a greater number may be secured to the shafts 9 and 10, and thereby provide for the setting of a corresponding number of teeth. The disks on each shaft are spaced apart by collars 8ª. 8ᵇ represents wedge-shaped washers fitting between the disks and the sides of the jaws.

Slidably secured upon the pivot-pin 3 of the jaws 1 and 2 and on each end thereof are stops or guards 11 and 12, provided with right-angular flanges 13 and 14, which bear against edges of the teeth and prevent the disks from acting thereon too near the blade of the saw.

15 and 16 designate two oppositely-disposed spring-arms having a yoke 17ª connected to one of the jaws by a threaded bolt 17, passing through the part 18 of the rear jaw, to which the arms are secured.

19 and 20 are guides or dogs on the ends of the respective arms and are on a line with the teeth of the saw with which they engage. These dogs are arranged to successively engage the teeth as the saw is moved through the tool, thus indicating the proper point for setting the same.

The depending extensions on the jaws, or at least one of them, will at all times lie flat against the blade of the saw, thus causing the tool to remain in a parallel or in the same plane with the longitudinal center of the same blade.

It will be seen that it will not only be necessary to force the handles of the tool together to bend the teeth at a tangent to the blade, and it will be readily apparent that the operation of the device will be purely automatic after being properly adjusted.

In the constructions shown in the modification the stops or guards 11 and 12 are provided with extended ends 11ª and 12ª, which are connected at the upper extremities by transverse bar 19ª, intermediate of the ends of which is a socket 20ª. A yoke 21 is carried by the pivotal points of the respective jaws and straddles the extended ends of the stops or guards above referred to, and an adjusting-screw 22 is threaded in the yoke and is provided with a head which fits in the socket 20ª, so that when said screw is operated the guards can be adjusted to and away from the teeth of the saw. In this construction also the yoke 17ª is arranged intermediate the jaws and adjacent to the disks.

In order to provide a resilient contact for the saw when the jaws are forced together to set the teeth, springs 24 and 25 are provided, which can be adjusted toward and from the plates 6 and 7 by means of set-screws 26 and 27. Of course it will be understood that these springs can be dispensed with if found desirable. However, I prefer to employ them for the reason that the pressure will be relieved upon the plate of the saw during the process of setting the teeth.

While I have described in detail what appears to me to be the very best form of invention, I would have it understood that I reserve the right to make such changes and alterations as may properly come within the scope of my invention without departing from the spirit thereof.

Having thus fully described my invention, what I claim as new, and desire to secure by Letters Patent, is—

1. A saw-set comprising a pair of pivoted jaws each having an opening, shafts extending across the openings, and toothed disks mounted on the shafts.

2. A saw-set comprising a pair of pivoted jaws each having an opening, shafts extending across the openings, and one or more toothed disks of different diameters mounted on each of the shafts.

3. A saw-set comprising a pair of pivoted jaws each having an opening, shafts extending across the openings, and wedge-shaped adjustable toothed disks mounted on the shafts.

4. A saw-set comprising a pair of pivoted jaws each having an opening, shafts extending across the openings, a pair of wedge-shaped adjustable toothed disks of different diameters mounted on each shaft, spacing-collars between the disks, and wedge-shaped washers fitting between the disks and the sides of the jaws.

5. A saw-set comprising a pair of pivoted jaws each having an opening, and a depending blade, shafts extending across the openings and toothed disks mounted on the shafts.

6. A saw-set comprising a pair of pivoted jaws each having an opening, and a depending blade, springs secured to the blades, shafts extending across the openings and toothed disks mounted on the shafts.

7. A saw-set comprising a pair of pivoted jaws each having an opening, and a depending blade, springs secured to the blades, set-screws working across the blades for adjusting the outer ends of the springs, shafts extending across the openings and toothed disks mounted on the shafts.

8. A saw-set comprising a pair of pivoted jaws, each having an opening, shafts extending across the openings, toothed disks mounted on the shafts, and stops slidably secured on the pivot-pin of the jaws, having right-angle flanges adapted to bear against the teeth of the saw operated upon.

9. A saw-set comprising a pair of pivoted jaws each having an opening, shafts extending across the openings toothed disks mounted on the shafts; stops slidably mounted on the pivot-pin of the jaws having right-angle flanges adapted to bear against the teeth of the saw operated upon, and a transverse bar connecting the stops, a yoke mounted on the pivot-pin of the jaws and straddling the stops and an adjusting-screw working in the yoke and bearing against the transverse bar.

10. A saw-set comprising a pair of pivoted jaws each having an opening, shafts extending across the openings, toothed disks mounted on the shafts, spring-arms having a yoke and provided with guides at the ends of the arms for engaging the saw-teeth, and a bolt whereby the springs are adjustably secured by their yoke to one of the jaws.

In testimony whereof I affix my signature in presence of two witnesses.

THEODORE ROSEBOOM.

Witnesses:
  WM. KARNES,
  JOHN FOX.